United States Patent [19]
Lee et al.

[11] Patent Number: 5,946,691
[45] Date of Patent: Aug. 31, 1999

[54] METHOD OF PRESENTING, STORING, AND UPDATING A FILING IDENTIFIER FOR A DATA RECORD

[75] Inventors: Se-Wai Lee, Bellevue; Kenn M. Takara, Redmond; Jonathan A. Gibney, Seattle; Brian W. MacDonald, Bellevue, all of Wash.

[73] Assignee: Microsoft Corporation, Redmond, Wash.

[21] Appl. No.: 08/648,347

[22] Filed: May 15, 1996

[51] Int. Cl.$^6$ ................................................... G06F 17/30
[52] U.S. Cl. ............................. 707/100; 707/3; 707/102; 707/200; 395/680
[58] Field of Search ............................. 707/100, 3, 102, 707/200; 364/222.82; 395/680

[56] References Cited

U.S. PATENT DOCUMENTS

| | | | |
|---|---|---|---|
| 4,491,911 | 1/1985 | Sato | 364/200 |
| 5,321,831 | 6/1994 | Hirose | 707/1 |
| 5,333,252 | 7/1994 | Brewer et al. | 395/148 |
| 5,392,390 | 2/1995 | Crozier | 395/161 |
| 5,414,834 | 5/1995 | Alexander et al. | 395/600 |
| 5,421,015 | 5/1995 | Crozier | 395/650 |
| 5,513,348 | 4/1996 | Ryu et al. | 395/605 |
| 5,522,066 | 5/1996 | Lu | 375/600 |
| 5,526,518 | 6/1996 | Kashio | 395/611 |
| 5,551,024 | 8/1996 | Waters | 707/3 |
| 5,682,524 | 10/1997 | Freund et al. | 395/605 |

*Primary Examiner*—Paul V. Kulik
*Assistant Examiner*—Jean M. Corriélus
*Attorney, Agent, or Firm*—Jones & Askew, LLP

[57] ABSTRACT

A method of the present invention receives information in at least one of a plurality of information fields associated with the data record and provides a designated field for receiving a filing identifier for filing the data record. The filing identifier identifies the location used by the computer system for storing the data record. A method of the present invention receives the filing identifier in the designated field in response to receiving the information within selected fields of the data record and automatically updates the filing identifier when information in the selected fields is modified. The method may further include the step of automatically generating, by the computer system, a plurality of predefined filing formats for the filing identifier based on the information received in at least one of the information fields. An option may be provided to select one of the predefined filing formats for automatic insertion in the designated field. Another aspect of the present invention may include automatically updating the predefined filing formats if the information received in at least one of the information fields is modified. Also, the predefined filing identifier may be updated simultaneously with the updating of the preselected formats.

20 Claims, 11 Drawing Sheets

METHOD OF PRESENTING, STORING, AND UPDATING A FILING IDENTIFIER FOR A DATA RECORD

FIELD OF THE INVENTION

The present invention relates to the field of data record management, and particularly to a method for automatically updating an identifier used in filing the data record in a computer system.

BACKGROUND OF THE INVENTION

In an effort to organize information, personal information manager application programs have provided an electronic work environment which encompasses scheduling, electronic mail management, task management ("to-do" lists), and contact management. Contact manager programs allow computer users to keep track of only actions that are important and to view those actions together in such a way that is useful. Contact managers are frequently used to store personal contacts and serve as a type of computerized address book. Many computer applications have features that serve as "contact managers" that organize relevant data that a person has entered related to the contacts. Although some contact managers provide multiple fields that may be used to store information about a contact, contact managers generally store or file the information according to a single preselected field. For example, conventional contact managers typically sort contact records based on a single field related to corresponding contact information, such as in alphabetical order by last name or company name. This forces a user to enter false data in certain fields so that the contact manager can sort in a more usable fashion preferred by the user. For example, the user may enter a company name in a "Last name" field because the type of business is more easily remembered by the user and because the user would prefer to see the contact in a sorted list that is not exclusively sorted by company names. Additionally, the user may prefer to file or sort by the first name or some other identifier for another contact.

Thus, there is a need in the art for a method of identifing data records that provides a useful option that organizes records automatically according to a selected label designated by the user. There is also a need in the art to provide a mechanism to automatically update a filing identifier if information upon which the filing identifier is based changes.

SUMMARY OF THE INVENTION

Generally described, the present invention relates to a computer-implemented method for filing a data record of a plurality of data records. The data records have a plurality of fields for receiving information related to the subject of the data record.

More particularly described, a method of the present invention receives information in at least one of a plurality of data fields associated with the data record and provides a designated field for receiving a filing identifier. The filing identifier identifies the location used by the computer system for filing the data record in a sorted list. The method of the present invention receives the filing identifier in the designated field in response to receiving the information within data fields of the data record and automatically updates the filing identifier in the designated field when information in the data fields is modified.

The method of the present invention may further include the step of automatically generating, by the computer system, a plurality of predefined filing formats for the filing identifier based on the information received in at least one of the data fields of the data record. Each predefined filing format is contained in a filing format field. The computer may select one of the predefined filing formats for the filing identifier by automatically inserting one of the predefined filing format fields into the designated field. Another aspect of the present invention may include automatically updating the information in the predefined filing format fields if the information received in at least one of the data fields is modified. Additionally, a plurality of options for selecting one of the predefined filing formats for automatic insertion in the designated field may be provided. Also, the filing identifier may be updated simultaneously with the updating of the predefined filing format fields.

The present invention may be particularly useful with a contact manager that organizes a plurality of contact records. The contact manager of the present invention uses a designated field for the filing identifier, generally referred to as the "file as" field. The user inputs contact information in preselected data fields (i.e., name, company, address, etc.) in a normal manner. The "file as" field is provided for each contact record. Within this "file as" field, the user may enter any name, label, or filing identifier that the user desires for filing this contact record within the structure of the contact manager. This allows the contact record to be filed or sorted according to the filing identifier provided in the "file as" field.

The "file as" field has a selected number of predefined formats for the filing identifier in the "file as" field. These predefined formats are automatically presented to a user in a list when the user inputs information and selects the "file as" field or function. The preselected formats are: (1) last name, first name; (2) First name last name; (3) company; (4) last name, first name (company); and (5) company (last name, first name). As the user adds information to the contact record, the "file as" field for the selected format is automatically updated with corresponding information.

The user may use one of the available predefined filing formats for the "file as" field or, instead, the user can use another filing identifier. The user may then save the contact information along with the filing identifier in the "file as" field. In response to saving the contact information with the filing identifier, an identifier field is created to serve as a pointer to the filing format that the user has selected for the "file as" field. Thus, when sorting is desired, the computer system sorts the contact information which is pointed to by the pointer in the identifier field.

When the first name, last name, or company name is changed for a particular contact, the information in the "file as" field is automatically changed to reflect the user's change. Thus, a user is not required to change information in both the name and/or company field and the "file as" field.

Thus, it is an object of the present invention to provide a designated filing field for a data record.

It is a further object of the present invention to automatically update information of the designated filing field of a contact record if information associated with the filing field in the contact record is modified.

It is a further object of the present invention to automatically generate a plurality of predefined filing formats for use as a filing identifier based on information received in at least one of the data fields of a data record.

It is a further object of the present invention to provide a user with an option to use a predefined filing format for a filing identifier or to select a different filing identifier.

These and other objects, features, and advantages of the present invention will become apparent from reading the following description in conjunction with the accompanying drawings.

DETAILED DESCRIPTION OF THE PREFERRED EMBODIMENT

Referring to the figures, in which like numerals reference like parts throughout the several views, the preferred embodiment of the present invention is illustrated. As discussed above, the preferred embodiment of the present invention automatically provides a designated field for filing, generally referred to as the "file as" field. The user inputs contact information in data fields (i.e., name, company, address, etc.) in a normal manner. Within this "file as" field, the user may enter any name, label, or filing identifier that the user desires for filing this contact record within the structure of the contact manager. This allows the contact record to be filed or sorted according to the filing identifier provided in the "file as" field.

In the preferred embodiment, the "file as" field has five predefined formats for the "file as" field. These predefined formats are automatically presented to a user in a list when the user inputs information and selects the "file as" field or function. The five predefined formats are: (1) First name last name; (2) last name, first name; (3) company; (4) company (last name, first name); and (5) last name, first name (company). As the user adds information to the contact record, the fields for the selected format are automatically updated with corresponding information.

The user may select one of the predefined formats to enter in the "file as" field or, instead, the user can enter another preferred filing identifier. The user may then save the contact information along with the filing identifier in the "file as" field. In response, an identifier field is created to serve as a pointer to the filing format that the user has selected for the "file as" field. Thus, when sorting is desired, the computer system sorts the contact information which is pointed to by the identifier field.

Although the preferred embodiment will be generally described in the context of a personal information manager program or contact manager program and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a standalone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including a central processing unit (CPU), memory storage devices for the CPU, connected display devices, and input devices. Furthermore, these processes and operations may utilize conventional computer components in a heterogeneous distributed computing environment, including remote file servers, remote computer servers, and remote memory storage devices. Each of these conventional distributed computing components is accessible by the CPU via a communication network. Those skilled in the art will recognize that such a communications network may be a local area network or may be a geographically dispersed wide area network, such as an enterprise-wide computer network or the global Internet.

The processes and operations performed by the computer include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, values, elements, symbols, characters, terms, numbers, points, records, objects, images, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, altering, etc.

which are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hardwired logic or programs stored in nonvolatile memory, such as read only memory.

The Operating Environment

Figure 1:
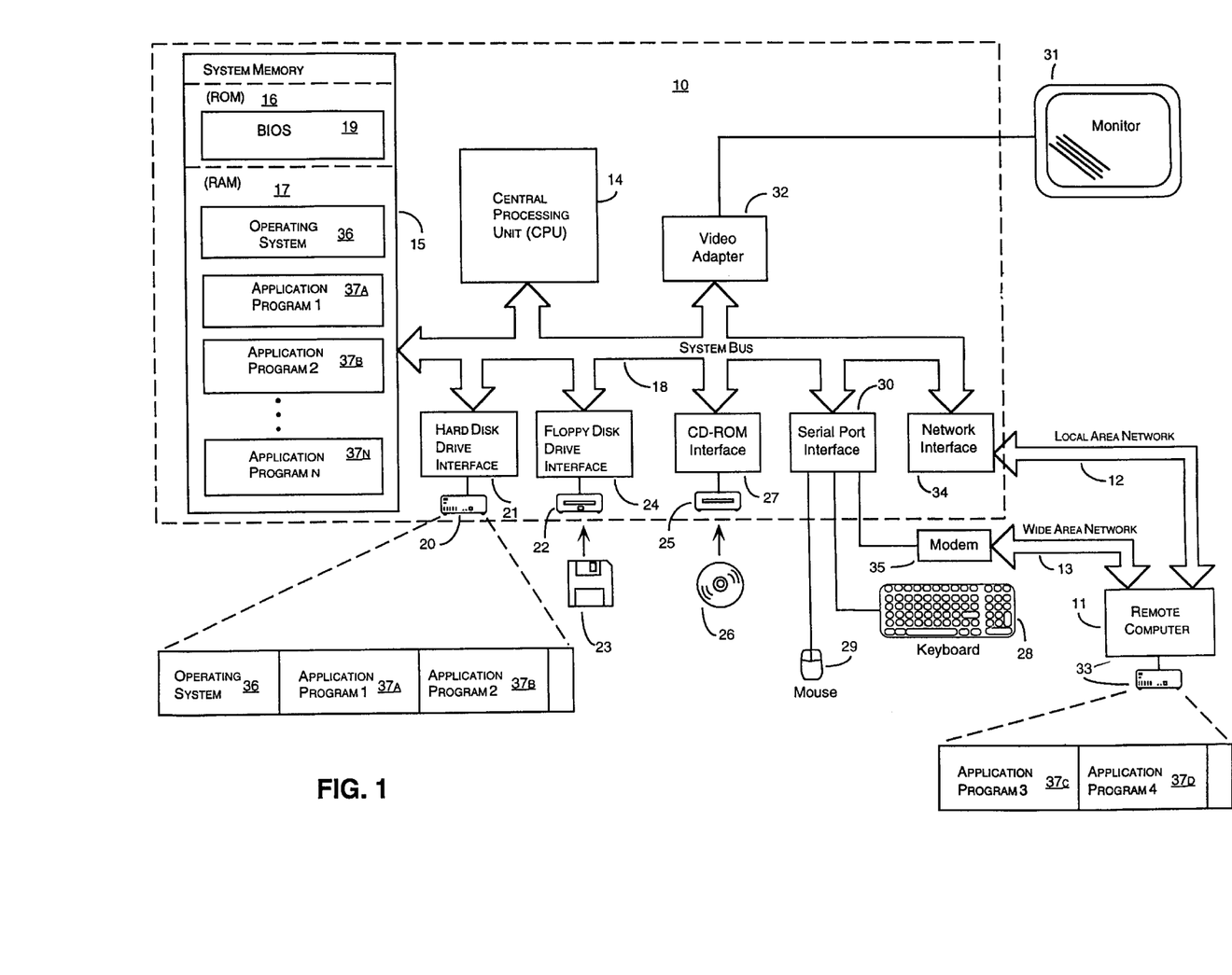
FIG. 1 is a block diagram of the operating environment of the present invention.

FIGS. 1 illustrates various aspects of the preferred computing environment in which the present invention is designed to operate. Those skilled in the art will immediately appreciate that FIG. 1 and the associated discussion are intended to provide a brief, general description of the preferred computer hardware and program modules, and that additional information is readily available in the appropriate programming manuals, user's guides, and similar publications.

FIG. 1 illustrates a conventional personal computer 10 suitable for supporting the operation of the preferred embodiment of the present invention. As shown in FIG. 1, the personal computer 10 operates in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or computer server.

The personal computer 10 includes a central processing unit (CPU) 14, such as the 80486 or "PENTIUM" microprocessors manufactured by Intel Corporation of Santa Clara, Calif. The personal computer also includes system memory 15 (including read only memory (ROM) 16 and random access memory (RAM) 17), which is connected to the CPU 14 by a system bus 18. A basic input/output system (BIOS) 19 for the personal computer 10 is stored in ROM 16. Those skilled in the art will recognize that the BIOS 19 is a set of basic routines that helps to transfer information between elements within the personal computer 10.

Within the personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM drive 25, which is used to read a CD-ROM disk 26, is connected to the system bus 18 via a CD-ROM interface 27. A user enters commands and information into the personal computer 10 by using a keyboard 28 and/or pointing device, such as a mouse 29, which are connected to the system bus 18 via a serial port interface 30. Other types of pointing devices (not shown in FIG. 1) include track pads, track balls, and other devices suitable for positioning a cursor on a computer monitor 31. The monitor 31 or other kind of display device is connected to the system bus 18 via a video adapter 32.

The remote computer 11 in this networked environment is connected to a remote memory storage device 33. This remote memory storage device 33 is typically a large capacity device such as a hard disk drive, CD-ROM drive, magneto-optical drive or the like. The personal computer 10 is connected to the remote computer 11 by a network interface 34, which is used to communicate over the local area network 12.

As shown in FIG. 1, the personal computer 10 is also connected to the remote computer 11 by a modem 35, which is used to communicate over the wide area network 13, such as the Internet. The modem 35 is connected to the system bus 18 via the serial port interface 30. Although illustrated in FIG. 1 as external to the personal computer 10, those of ordinary skill in the art will quickly recognize that the modem 35 may also be internal to the personal computer 11, thus communicating directly via the system bus 18. The connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as an operating system 36, application programs 37, and data are provided to the personal computer 10 via one of the local or remote memory storage devices, which may include the local hard disk drive 20, floppy disk 23, CD-ROM 26, RAM 17, ROM 16, and the remote memory storage device 33. In the preferred personal computer 10, the local hard disk drive 20 is used to store data and programs, including the operating system and programs.

The operating system 36, in conjunction with the BIOS 19 and associated device drivers, provides the basic interface between the computer's resources, the user, and the application program 37a. The operating system 36 interprets and carries out instructions issued by the user. For example, when the user wants to load an application program 37a, the operating system 36 interprets the instruction (e.g., double clicking on the application program's icon) and causes the CPU 14 to load the program code into RAM 17 from either the local hard disk drive 20, floppy disk 23, CD-ROM 26, or the remote memory storage device 33. Once the application program 37a is loaded into the RAM 17, it is executed by the CPU 14. In case of large programs, the CPU 14 loads various portions of program modules into RAM 17 as needed.

As discussed earlier, the preferred embodiment of the present invention is embodied in a personal information manager program, which is designed to operate in conjunction with Microsoft Corporation's "WINDOWS 95" or "WINDOWS NT" operating systems. However, it should be understood that the invention can readily be implemented in other operating systems, such as Microsoft Corporation's "WINDOWS 3.1" operating system, IBM Corporation's "OS/2" operating system, and the operating system used in "MACINTOSH" computers manufactured by Apple Computer, Inc.

The operating system 36 provides a variety of functions or services that allow an application program 37a to easily deal with various types of input/output (I/O). This allows the application program 37a to issue relatively simple function calls that cause the operating system 36 to perform the steps required to accomplish various tasks, such as displaying text on the monitor 31 or printing text on an attached printer (not shown). Generally described, the application program 37a communicates with the operating system 36 by calling predefined functions provided by the operating system 36. The operating system 36 responds by providing the requested information in a message or by executing the requested task.

In the context of the present invention, the primary interaction between the preferred program and the operating system involves mouse-related functions and messages. The program receives mouse coordinates and mouse button status from the operating system.

Those skilled in the art will understand and appreciate that operating systems for displaying and utilizing windows may be implemented by using object-oriented programming languages and techniques. Object-oriented programming techniques are utilized by those skilled in the art of computer programming because they provide a powerful way to view the interaction of a user with a computer system. For example, one particular "object" that people often work with on computer screens is called a window. The window receives user input from a keyboard 28, mouse 29, or pen, and displays graphical output upon which a user may interact. A computer program is responsible for generating the window and for responding to user interactions with the window. The window often contains the computer program's title bar across the top of the window, menus, sizing borders, and perhaps other objects.

The window may contain additional, smaller windows called "child windows" or "dialogue boxes", which are subspecies or subclasses of windows. In the context of the present invention, a contact record of a personal information manager may be considered a dialogue box window. Dialogue box windows may take the form of check boxes, text entry fields, list boxes, and the like. These objects when displayed on the computer screen may be pressed or clicked or scrolled. A user sees a window as an object on the screen, and interacts directly with the object by pushing buttons, or scrolling a scroll bar, or tapping a handle displayed in the window. Buttons may control a function for the particular window.

A window generated by a computer program receives user input in the form of messages to the window. The messages are generated by an event handling routine that is responsive to user input such as tapping or clicking a control button on a stylus or mouse.

Data Record Filing and Management

Figure 2:
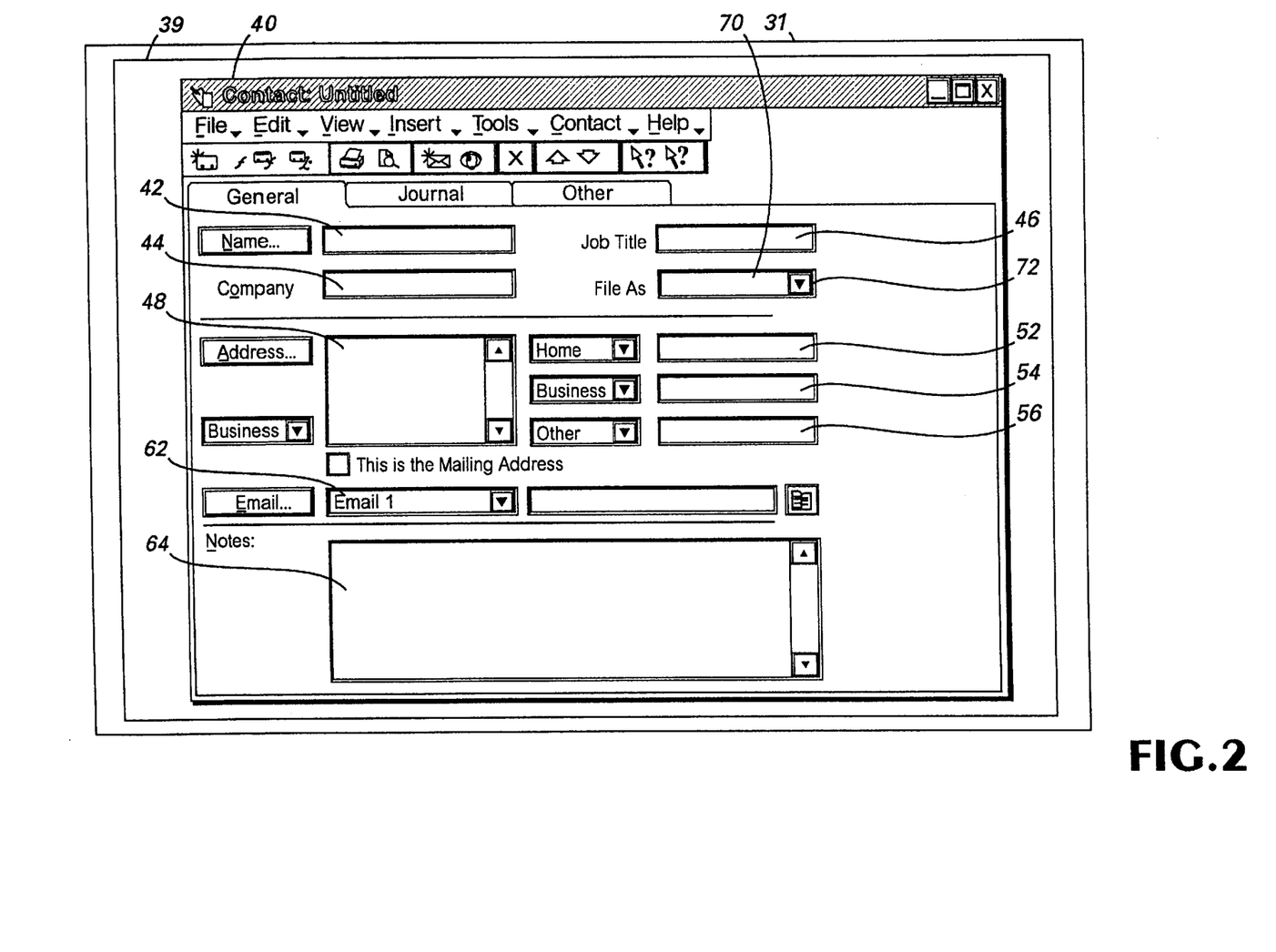
FIG. 2 is a data record that may be used in conjunction with the present invention.

Referring to FIG. 2, a contact record 40 of a personal information manager is illustrated. The contact record 40 of FIG. 2 illustrates the basic fields of the contact record 40 which have not yet received user input. As generally discussed above, the contact record 40 may be a dialogue box that has multiple fields for categorizing, organizing, and managing information related to a particular contact. A contact, as used herein, generally refers to an individual, company, entity, or association for which a user desires to maintain information. The contact record 40 has multiple fields for storing information related to the contact. Conventional contact identifying fields are shown such as, a name field 42, a company field 44, and a job title field 46. Examples of other fields that may be used in a contact manager are an address field 48, a home telephone number field 52, a business telephone number field 54, other telephone number field 56, an e-mail address field 62, and a general information field 64. The contact information fields discussed above are conventionally provided in many contact managers.

The information stored in a particular field may be changed directly by entering the field and making the desired change. In many contact managers, the name field 42, company field 44, and job title field 46 serve as the primary or default fields for storing or filing contact information. Records are typically filed in alphabetical order according to the information contained in the field. Because these fields are used for identifying the contact information, a user inputs information in these fields that has meaning to the user for identifying the particular contact. Because the name field 42, company field 44, and job title field 46 represent only three types of information and because a user may identify a contact with information unrelated to these three fields, a user may be forced to enter data in a designated field that is unrelated to the name of the field in order to have the contact stored or filed in a meaningful way to the user.

In order to overcome this filing problem associated with conventional contact managers and to provide convenient selection and updating of a filing mechanism, the present invention provides a designated field for a filing identifier, referred to herein as a "file as" field 70. For each contact that a user inputs to the contact manager database, the user may designate any label in the "file as" field 70 that the user desires for identifying or filing the contact in the contact manager database stored in the computer system memory. By providing the "file as" field 70 a user does not have to enter data in a field that is unrelated to a predetermined field. Additionally, by providing the "file as" field 70, the user may have all the contacts of the user's contact manager filed in a single field for convenient sorting or searching as the user desires. The user is not required to search or sort multiple fields when the user desires to browse through the user's contacts in a manner that identifies the contacts in a way that is meaningful to the user. Adjacent to the "file as" field 70, is a "file as" drop down menu button 72. The drop down menu button 72 is used to display predefined filing formats, as discussed in more detail below, that are automatically formatted for use in the "file as" field 70.

Figure 3:
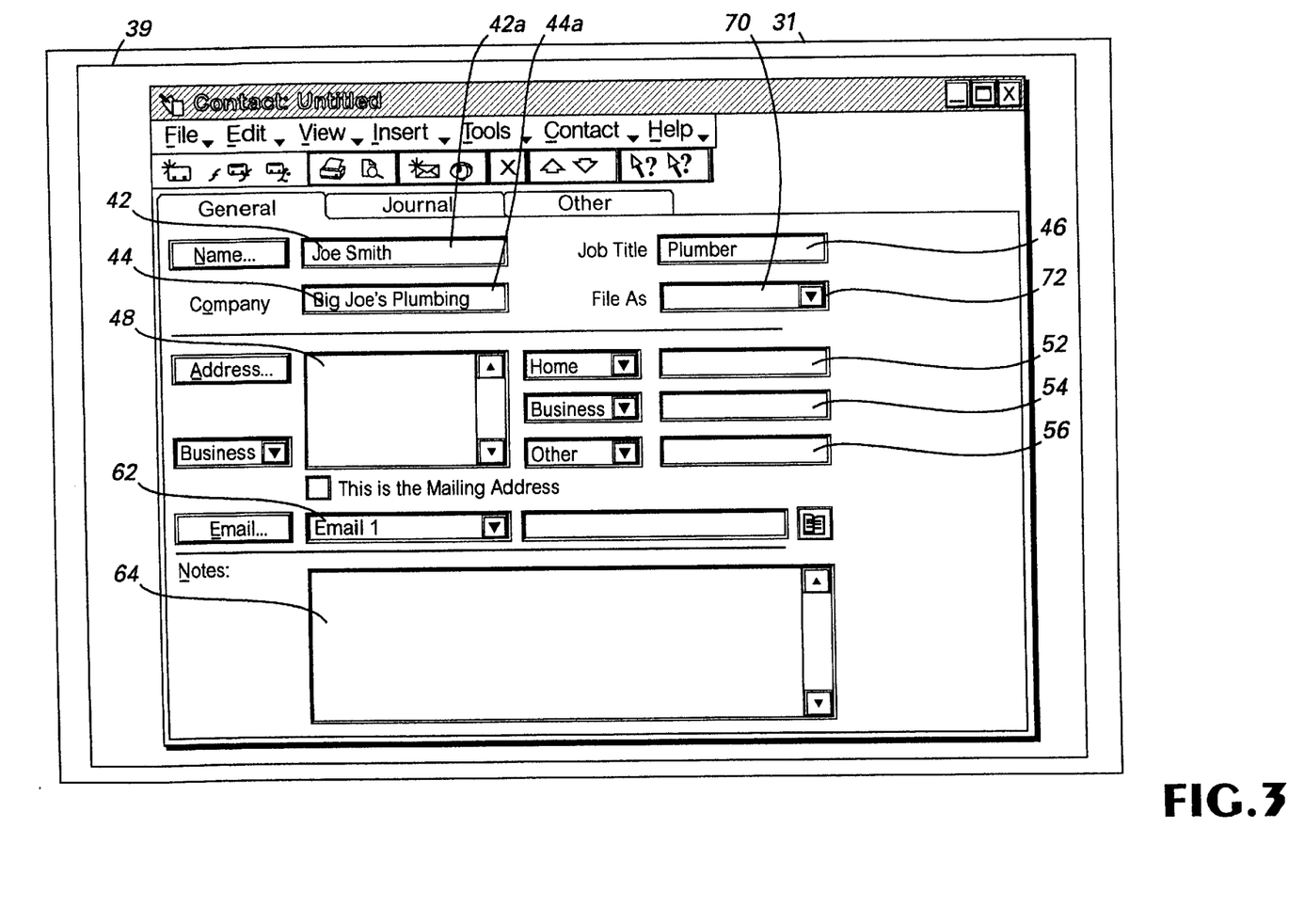
FIG. 3 illustrates a data record with information entered in various fields of the data record.

Referring to FIG. 3, a contact record 40 with user input information is shown. The contact record 40 is shown with information input in the name field 42, the company field 44, and the job title field 46. The contact's name 42a, "Joe Smith", is input in the name field 42, and the company name 44a, "Big Joe's Plumbing", is input in the company field 44. Joe Smith is a plumber as indicated by the job title 46a, "plumber", stored in the job title field 46. With the information in the name field 42 and the information in the company field 44, the preferred embodiment of the present invention may provide a plurality of predefined filing formats that may be entered in the "file as" field 70. Although the predefined filing formats are not shown in FIG. 3, the predefined filing formats are created as the user inputs information in the name field 42 and the company field 44, as discussed in more detail below. It should be appreciated that the other fields of the contact record 40 may be populated. However, the information that may be input in the other fields is not necessary for an understanding of the present invention.

Figure 4A:
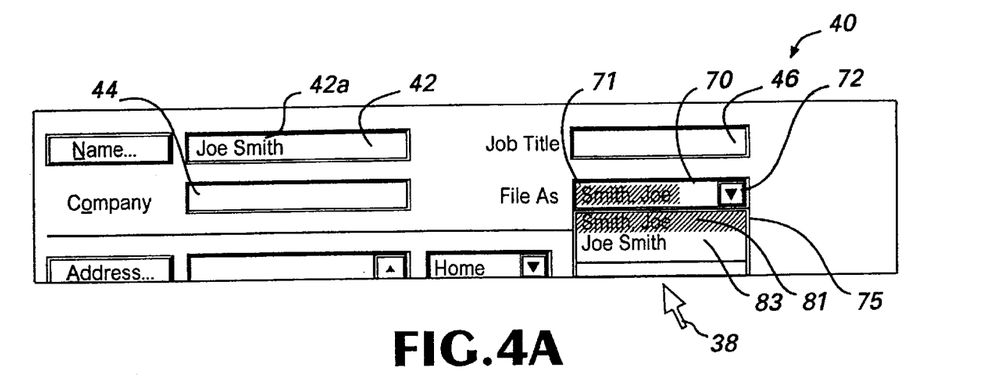
FIGS. 4A, 4B, and 4C illustrate the process of designating a filing identifier in accordance with an embodiment of the present invention.
Figure 4B:
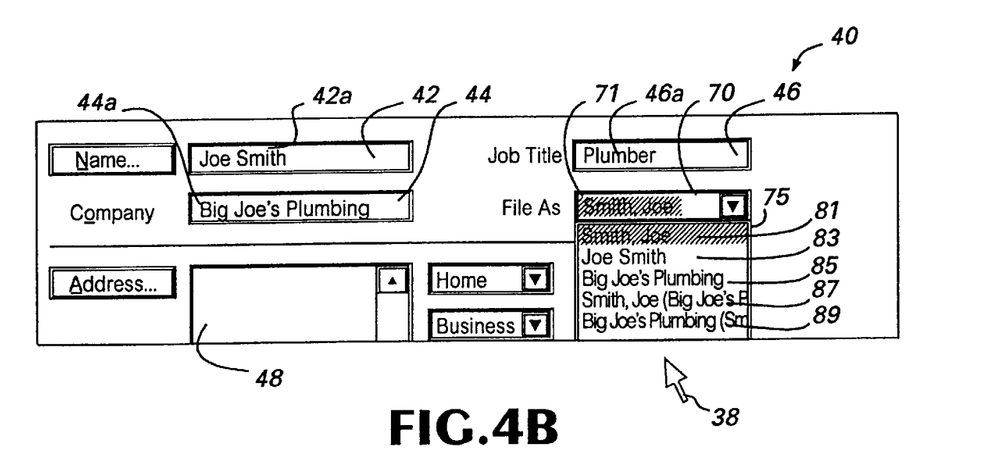
Figure 4C:
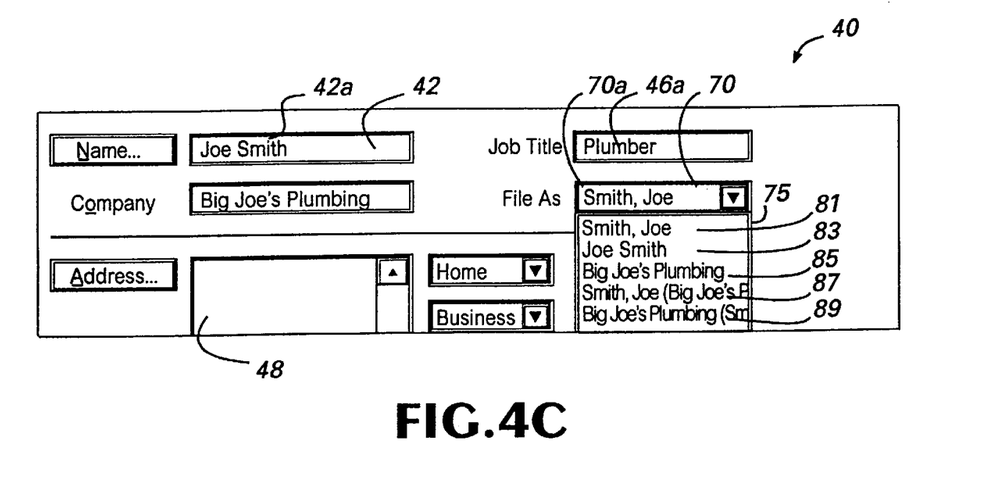

Referring to FIGS. 4A, 4B, and 4C, the method of automatically filling and displaying the predefined file formats is illustrated. When a user enters a new contact or updates a name or company name, the predefined filing formats for the "file as" field 70 are automatically generated. In the preferred embodiment of the present invention, five predefined filing formats are generated. The five predefined filing formats represent selected combinations of the information in the name field 42 and the company field 44. When the user inputs information in the name field 42 and the company field 44, the predefined filing formats for the "file as" field are populated as follows:

Lastname, Firstname

Firstname Lastname

Company

Lastname, Firstname (Company)

Company (Lastname, Firstname)

The preferred embodiment of the present invention places at the top of the list the predefined filing format that the user is most likely to use. This is the default predefined filing format. If the user prefers another default setting, the user may customize the user's system to display a user preferred default setting. The text of the predefined filing formats listed above are stored in a Lastname, Firstname format field 81; Firstname Lastname format field 83; a Company format field 85; Lastname, Firstname (Company) format field 87; and a Company (Lastname, Firstname) format field 89, respectively. When a user types in information in the name field 42 and/or company field 44, the information is copied to the appropriate predefined filing format field. Each contact record has five predefined filing format fields and a "file as" field stored as part of the contact record 40.

As discussed and shown in FIG. 3, the predefined filing format fields are not normally displayed as part of the contact record 40 although the user has input information in the name field 42 and the company field 44. The predefined filing format fields may be generally termed "hidden fields". In order to display the predefined filing format fields, a user must select the "file as" drop down menu button 72. When the user selects the "file as" drop down menu button 72, the combinations of the information from the name field 42 and the company field 44 forming the predefined filing formats is displayed in a drop down menu 75.

FIGS. 4A, 4B, and 4C, show the process of populating the predefined filing format fields 81, 83, 85, 87 and 89. When only the name "Joe Smith" has been entered in the name field 42, only the non-blank predefined filing format fields are populated. A predefined filing format is considered blank when information has not been entered in one of the fields that is used to populate a predefined filing format field. When information has been entered in each data field that is used to populate the predefined filing formats, the predefined filing format field is considered non-blank. As shown in FIG. 4A, when a user selects the "file as" drop down menu button 72, the non-blank predefined filing format fields are displayed. In FIG. 4A, the Lastname, Firstname format field 81 is populated with "Smith, Joe" and the Firstname Lastname format field 83 is displayed and populated with "Joe Smith". Additionally, when the name field 42 is filled, the default predefined filing format 71 is displayed in the "file as" field 70. The user may at anytime enter the desired filing identifier in the "file as" field 70. The user may select the desired filing identifier from the predefined filing formats displayed in the drop down menu 75 by double clicking the mouse cursor control when the cursor 38 is positioned on the desired predefined filing format.

Referring to FIG. 4B, the company field 44 and the job title field 46 are shown populated. With the company field 44 now populated, all five of the combinations available as predefined filing formats are automatically populated. As shown, all five predefined filing format fields may now be displayed when the "file as" drop down menu button 72 is selected. The company format field 85 is shown populated with "Big Joe's Plumbing". The format field 87 is populated with Lastname, Firstname (Company) "Smith, Joe (Big Joe's Plumbing)" and the Company (Lastname, Firstname) format field 89 is populated with "Big Joe's Plumbing (Smith, Joe)". It should be appreciated that the predefined filing formats are design choices and may comprise combinations of other data fields.

FIG. 4C shows the user's designation of a filing identifier for the "file as" field 70. The user has entered the job title 46a in the "file as" field 70 as the filing identifier. The job title was not presented as a predefined filing format for the user. However, the job title 46a was entered in the "file as" field 70 as a filing identifier because the job title 46a was the preferred filing identifier desired by the user. In accordance with the present invention, the contact record 40 containing the information related to "Joe Smith" and "Big Joe's Plumbing" is filed under the filing identifier "Plumber".

As seen in FIGS. 4A–4C, the name "Joe Smith" is input in the name field. In order to separate the name into the relevant parts, a name parsing program module is used. Such program modules are known to those skilled in the art. The name parser first determines if the first and last term (or any terms) in the name field contains a prefix or suffix generally used in an English name, such as Mr., Ms., Jr., etc. The name parser searches the prefix and suffix dictionary to determine if the terms in the name field are in the prefix or suffix dictionary. If so, these terms are not used to populate the predefined filing format fields. The first and last name may be determined by locating the terms of the remaining terms in the name field which are likely to be the first and last name by checking for the relation of the terms to each other, to commas, and/or to spaces between the remaining terms as known to those skilled in the art. After the terms are located that are likely to be first and last name, the terms may be stored for use in the predefined filing format fields.

Figure 5A:
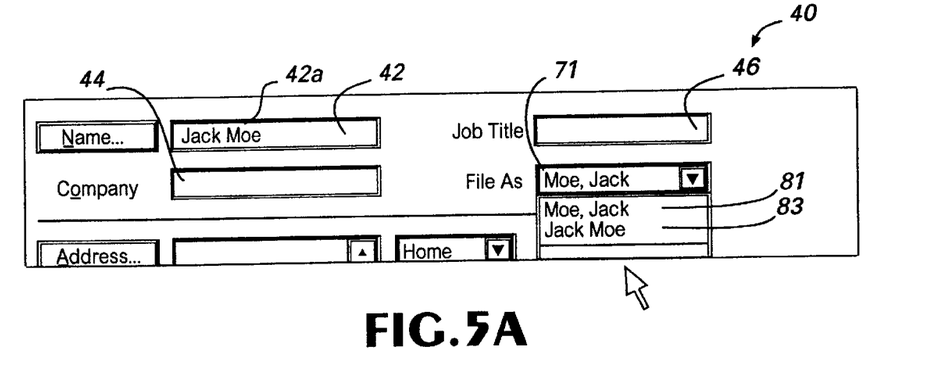
FIGS. 5A, 5B, and 5C illustrate the process of designating a filing identifier for filing a different data record in accordance with an embodiment of the present invention.
Figure 5B:
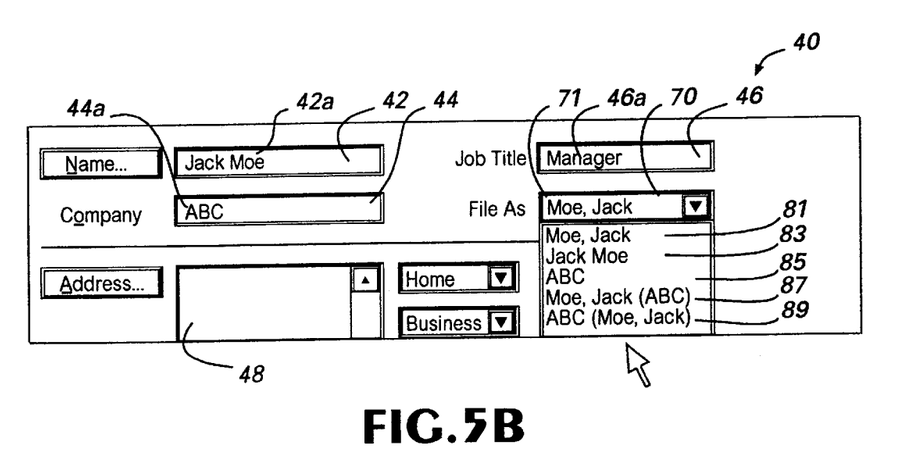
Figure 5C:
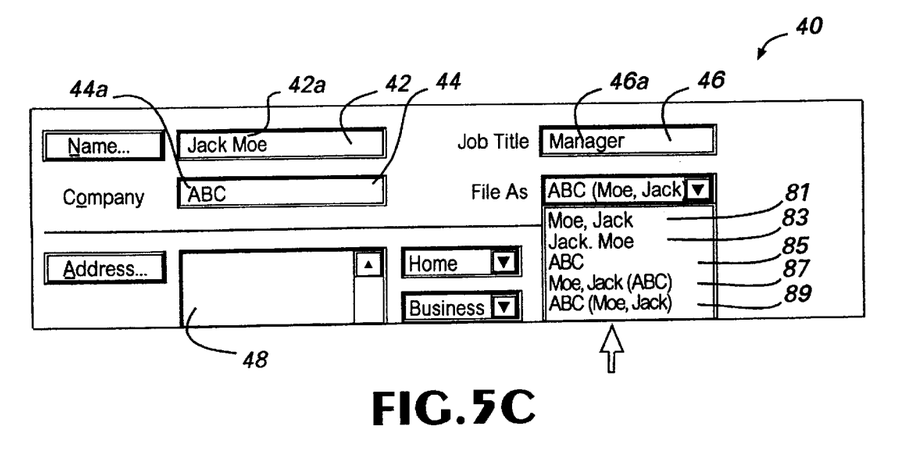

Referring to FIGS. 5A, 5B, and 5C, another contact record 40 is shown populated with information related to another contact. In FIG. 5A, the Lastname, Firstname format field 81 is populated with "Moe, Jack" and the Firstname Lastname format field 83 is displayed and populated with "Jack Moe". Additionally, when the name field 42 is filled, the default predefined filing format 71 is displayed in the "file as" field 70. Referring to FIG. 5B, the company field 44 and the job title field 46 are shown populated. The company format field 85 is shown populated with "ABC". As shown, all five predefined filing format fields may now be displayed when the "file as" drop down menu button 72 is selected. The Lastname, Firstname (Company) format field 87 is populated with "Moe, Jack (ABC)" and the Company (Lastname, Firstname) format field 89 is populated with "ABC (Moe, Jack)". FIG. 5C shows the user's filing identifier for the "file as" field 70. In the example of FIG. 5C, the user has selected one of the predefined filing formats from the predefined filing format fields by doubling clicking on the mouse selection mechanism with the cursor 38 positioned on the selected field, Company (Lastname, Firstname) 89. In accordance with the present invention, the contact record 40 containing the information related to "Jack Moe" and "ABC" is filed under the label "ABC (Moe, Jack)".

Figure 6A:
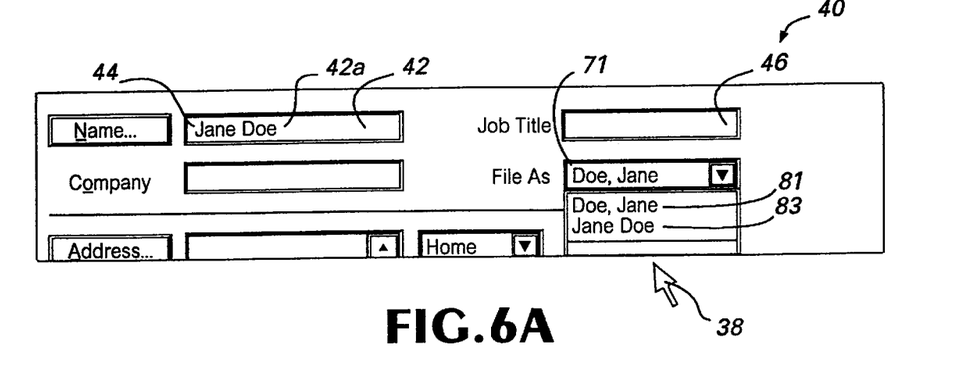
FIGS. 6A, 6B, and 6C illustrate the process of designating a filing identifier for filing a different data record in accordance with an embodiment of the present invention.
Figure 6B:
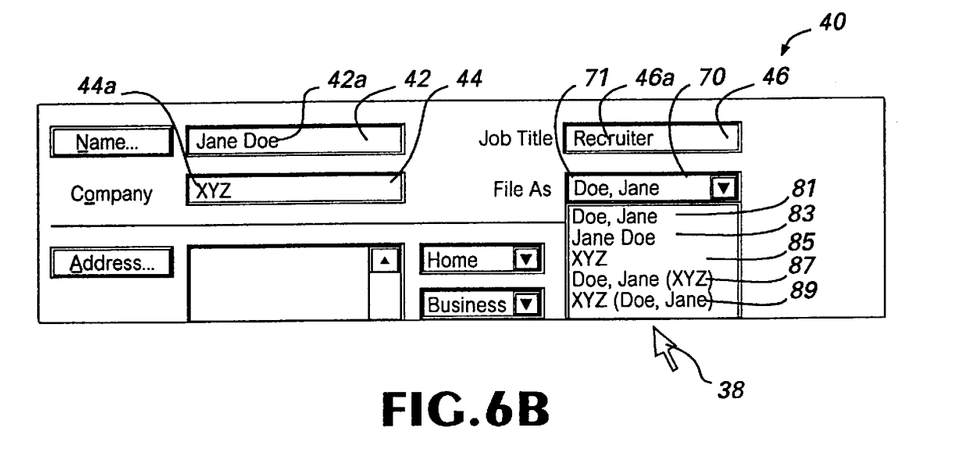
Figure 6C:
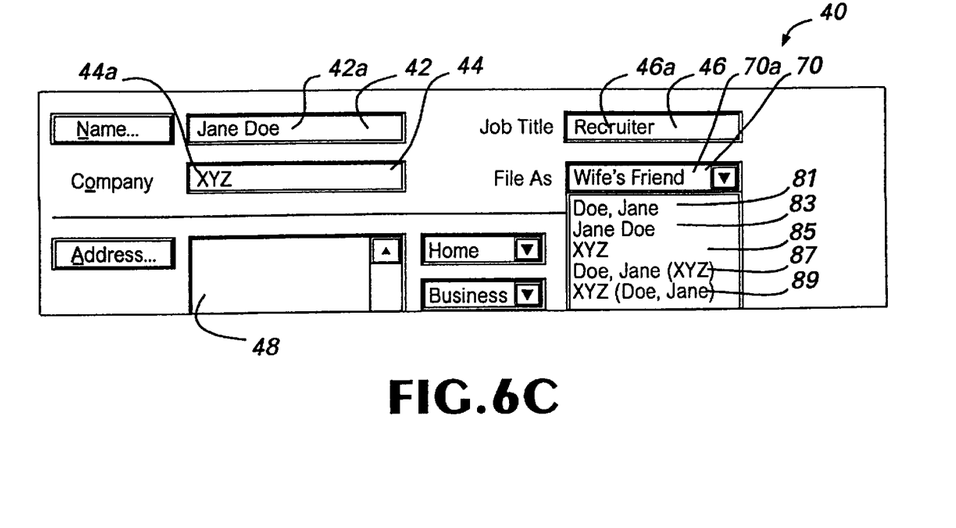

Referring to FIGS. 6A, 6B, and 6C, another contact record 40 is shown populated with information related to another contact. In FIG. 6A, the Lastname, Firstname format field 81 is populated with "Doe, Jane" and the Firstname Lastname format field 83 is displayed and populated with "Jane Doe". Additionally, when the name field 42 is filled, the default predefined filing format 71 is displayed in the "file as" field 70. Referring to FIG. 6B, the company field 44 and the job title field 46 are shown populated. The company format field 86 is shown populated with "XYZ". As shown, all five predefined filing format fields may now be displayed when the "file as" drop down menu button 72 is selected. The Lastname, Firstname (Company) format field 87 is populated with "Doe, Jane (XYZ)" and the Company (Lastname, Firstname) format field 89 is populated with "XYZ (Doe, Jane)". FIG. 6C shows the user's filing identifier for the "file as" field 70. In the example of FIG. 6C, the user has entered a filing identifier, wife's friend, that helps the user in identifying the contact. In accordance with the present invention, the contact record 40 containing the information related to "Jane Doe" and "XYZ" is filed under the filing identifier "wife's friend".

Figure 7A:
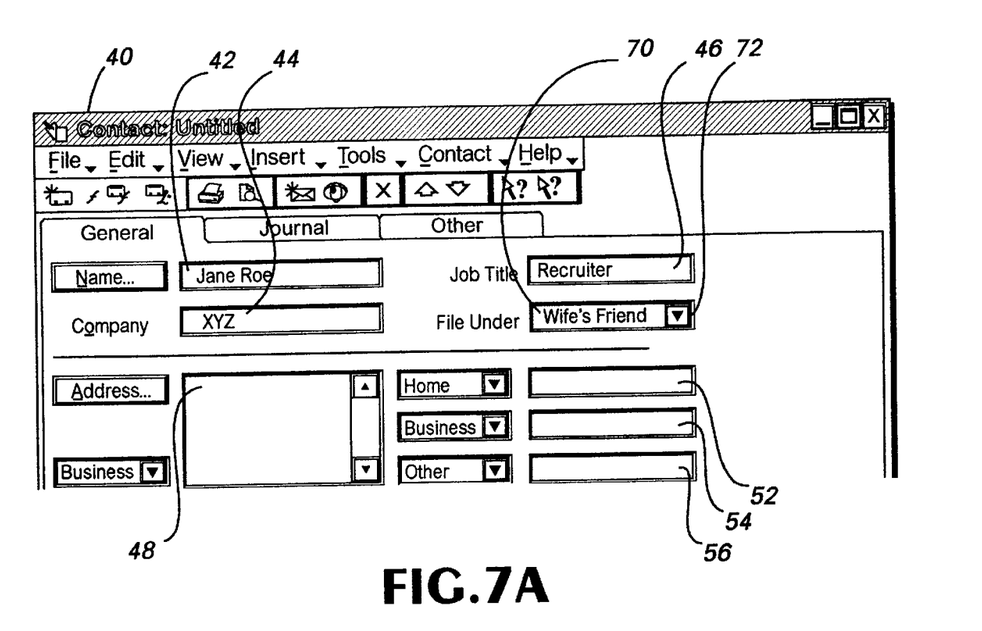
FIGS. 7A and 7B illustrate the process of updating the data record of FIGS. 6A, 6B, and 6C.
Figure 7B:
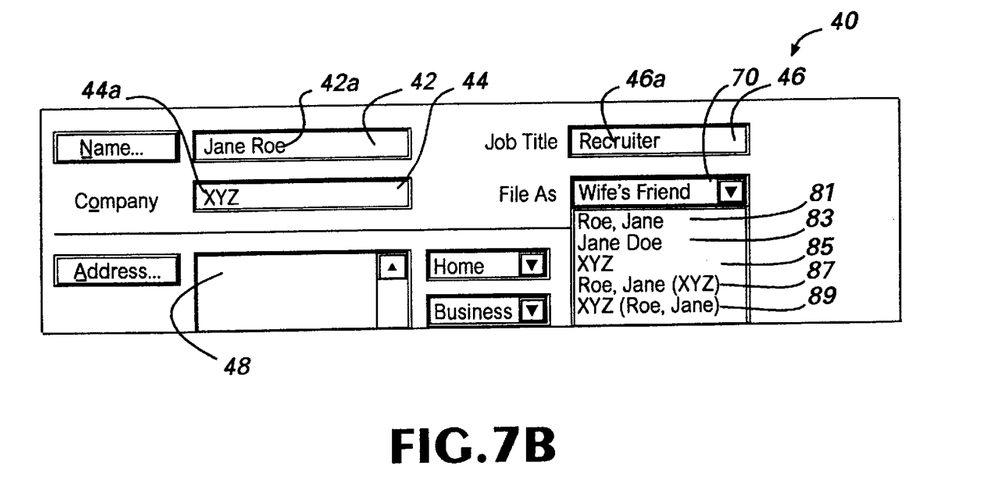

As discussed above, a user may update information in the contact record which relates to the "file as" field or predefined filing formats. Referring to FIG. 7A, the user has updated the contact record 40 discussed in connection with FIGS. 6A, 6B, and 6C to reflect a name change of the contact. In FIG. 7A, the user has changed the last name of the contact from "Doe" to "Roe". As noted above, the predefined filing formats are automatically updated when information contained in one of the data fields that is used to populate the predefined filing formats changes or is updated. Referring to FIG. 7B, when the user selects the "file as" drop down menu button 72, the menu 80 reflects the name change in each of the appropriate predefined filing format fields. The Lastname, Firstname format field 81 is populated with "Roe, Jane", and the Firstname Lastname format field 83 is displayed and populated with "Jane Roe". The company field 85 remains the same. The Lastname, Firstname (Company) format field 87 is updated to "Roe, Jane (XYZ)", and the Company (Lastname, Firstname) format field 89 is updated to "XYZ (Roe, Jane)". In the example of FIG. 7A, the "file as" field 70 is not affected by the user's change.

Figure 8A:
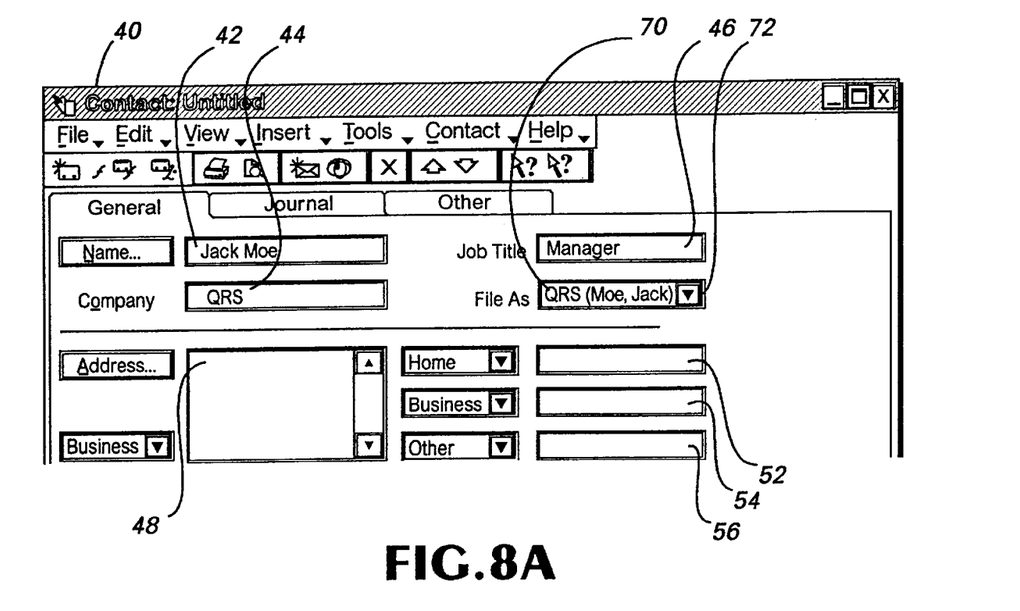
FIGS. 8A and 8B illustrate the process of updating the data record of FIGS. 5A, 5B, and 5C.
Figure 8B:
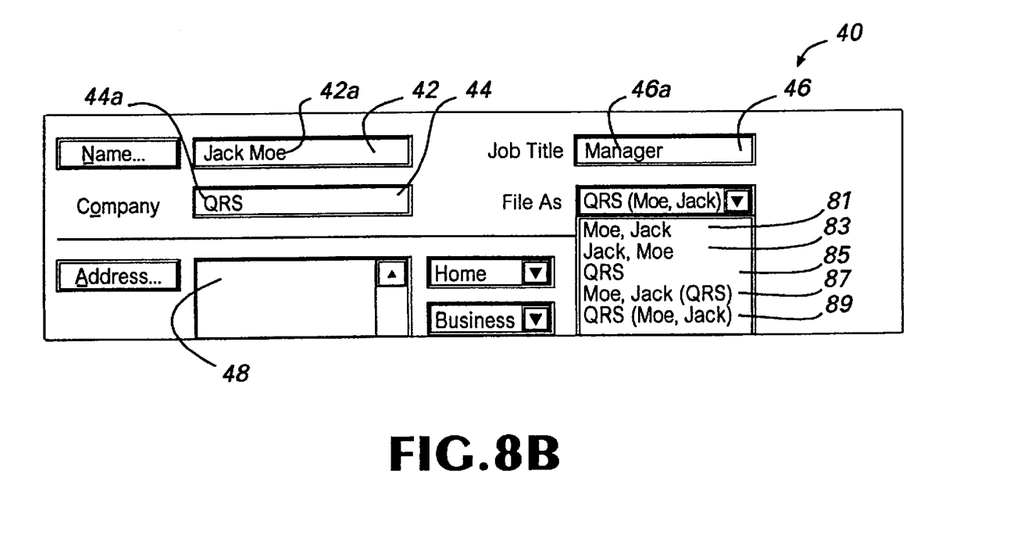

Referring to FIG. 8A, the user has updated the contact record 40 discussed in connection with FIGS. 5A, 5B, and 5C to reflect a company name change. In FIG. 8A, the user has changed the company name of the contact from "ABC" to "QRS". As noted above, the predefined filing formats are automatically updated when information contained in one of the data fields that is used to populate the predefined filing formats changes or is updated. Referring to FIG. 8B, when the user selects the "file as" drop down menu button 72, the menu 80 reflects the name change in each of the appropriate predefined filing format fields. The company field 85 is updated to "QRS". The Lastname, Firstname (Company) format field 87 is updated to "Moe, Jack (QRS)", and the Company (Lastname, Firstname) format field 89 is updated to "QRS (Moe, Jack)". As discussed above and shown in the examples of FIGS. 8A and 8B, the "file as" field 70 is automatically updated when the user makes a change to a field that is used to populate a predefined filing format field. In accordance with the present invention, the user does not have to enter any information in the "file as" field to reflect a change in another field that would have otherwise made the filing identifier inaccurate or incorrect. Thus, the filing position or storage location for contact records are automatically updated when a change occurs to information upon which the information in the "file as" field is based changes. In the example of FIGS. 8A and 8B, if the user had deleted the company name without a replacement, the "file as" field would be filled with the default predefined filing format field, which is the Lastname, Firstname field 81.

Figure 9:
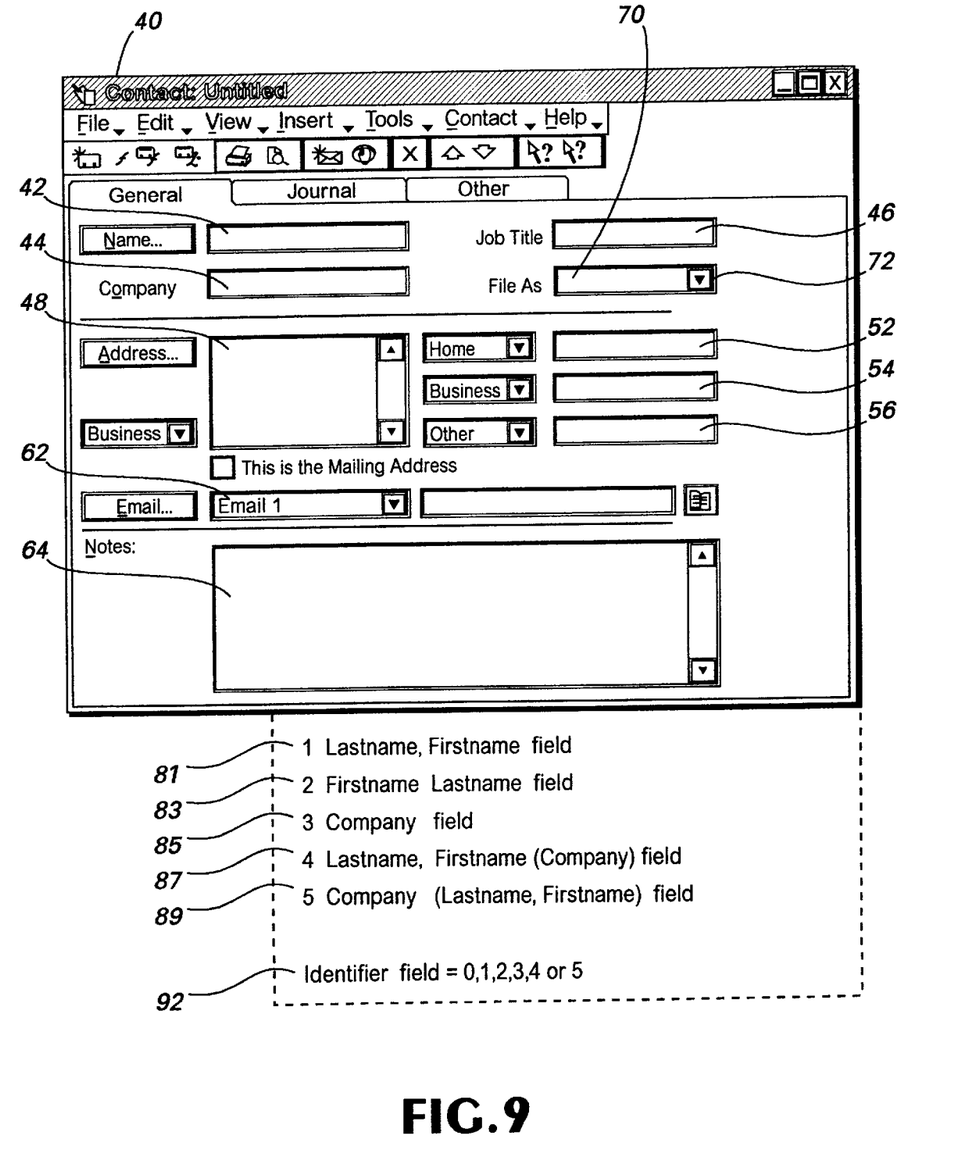
FIG. 9 illustrates the predefined format fields and an identifier field that are stored with the data record.

As noted above, five predefined filing format fields 81, 83, 85, 87, and 89 are stored with each contact record 40. Because the predefined filing format fields are not normally visible to the user selects, these fields may be generally referred to as "hidden" fields". While the predefined filing format fields may be visible upon user selection of the drop down menu button 72, an identifier field 92 is stored with each contact record 40 for use in updating the "file as" field and is not made visible to the user. As shown in FIG. 9, each predefined filing format field 81, 83, 85, 87, and 89 has an identifier number, 1, 2, 3, 4, and 5, respectively, associated with the field. The identifier number for a particular predefined filing format field is stored in the identifier field 92 when the user selects the particular predefined filing format field for use as the filing identifier. The computer program of the preferred embodiment of the present invention displays the contents of the field represented by the identifier number in the identifier field. As discussed above, the predefined filing formats are automatically updated when a user makes a change in a data field that affects one of the predefined filing formats. Thus, by displaying and storing the contents of the predefined filing format field represented by the identifier number of the identifier field in the "file as" field, the "file as" field is automatically updated simultaneously with the predefined filing format fields. If the user does not select a predefined filing format and enters the user's preferred filing identifier, the identifier value is set to zero. By setting the identifier value to zero, the contents typed in the "file as" field is saved and displayed as the filing identifier.

Figure 10:
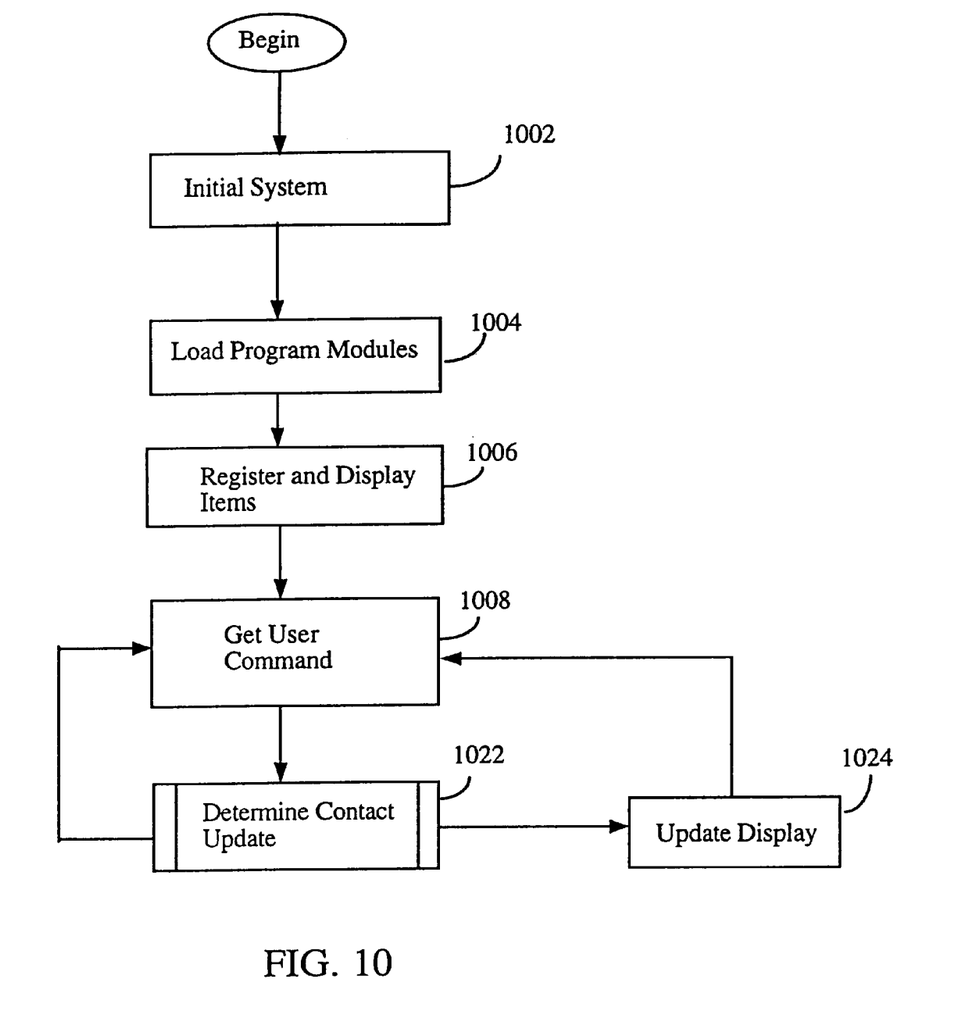
FIG. 10 is a flow diagram of processes used in connection with the present invention.

Referring to FIG. 10, a top level logical flow diagram for a computer-implemented process for controlling the items displayed by the graphical user interface on the display screen of the monitor is shown. Referring to FIGS. 1 and 10, the computer-implemented process or program 1000 begins at step 1001. In step 1002, the computer 10 is initialized upon system start-up, i.e., when the user powers-up the computer 10. Preferably, initialization of the computer 10 is conducted by the boot code, which is stored in the system memory and initiates a request to load certain program modules at step 1002, such as the operating system 36 and a application programs. These program modules typically support the display of associated control by the display screen on the monitor. In turn, the user can control the operation of the computer 10 and the operation of the program modules running on the computer 10 by selecting a desired control item and executing the underlying control function represented by the selected control item.

Upon completion of loading operations, a computer-implemented routine 1006 registers the locations of these program modules, and displays the control items. During the registration process, a program module can pass information relating to the control items to be displayed via the display screen. The positions on display screen of control items are registered with the focus manager. Control items can then be displayed by the display screen. Thus, the display screen can present for viewing a combination of control items.

After completing the registration process and presenting an initial display of the graphical user interface on the display screen, the computer 10 is now ready to accept a command from an input device, such as mouse 29. In step 1008, the system receives a command signal in response to the viewer's decision to conduct a desired control operation, such as a control related to the contact manager. At step 1022, a contact record 40 is updated as discussed as discussed in connection with FIGS. 3–8B and FIG. 11. Once the control operation is received, the display screen is updated, at step 1024, showing the appropriate changes to a contact record 40 is displayed.

Figure 11:
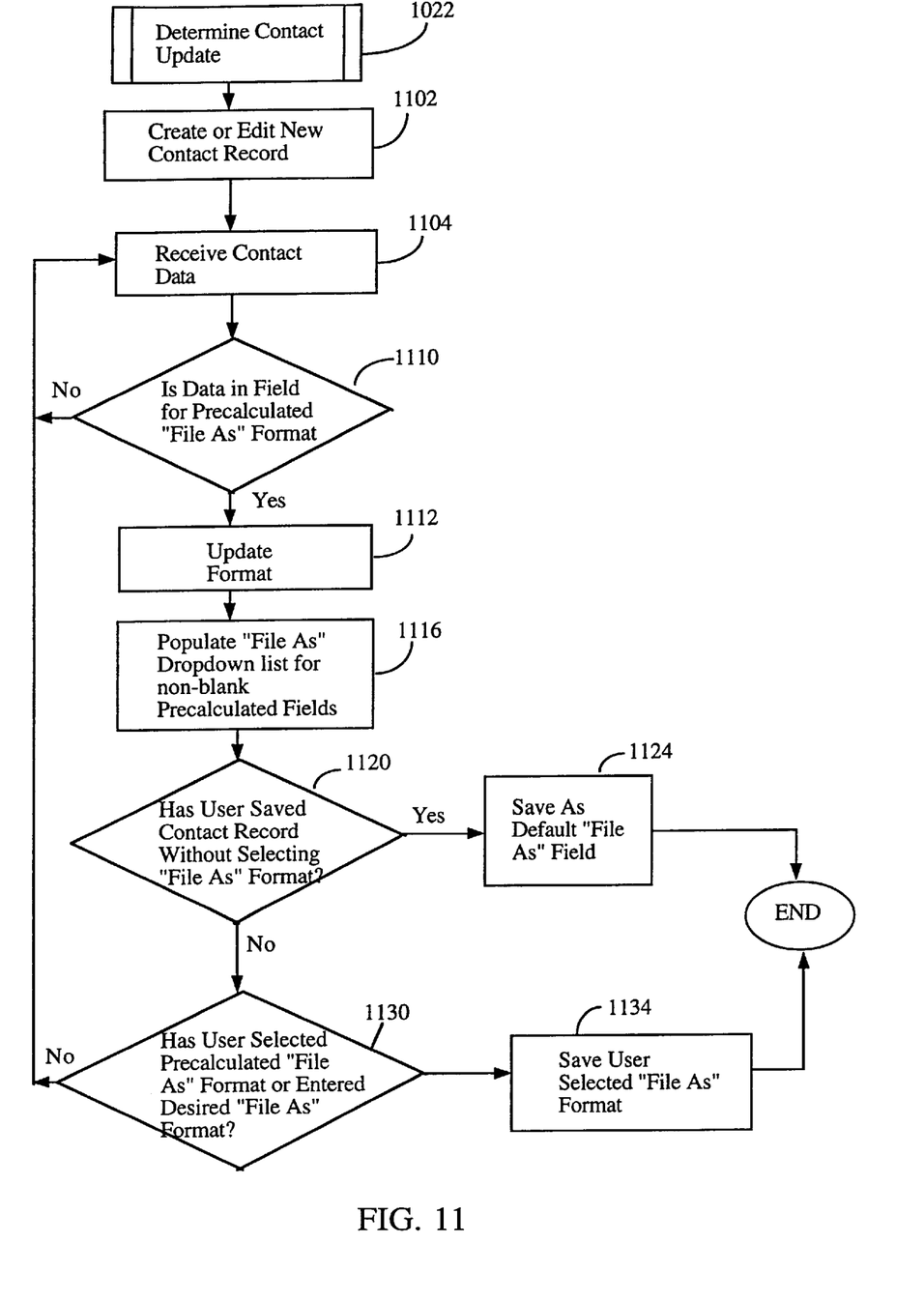
FIG. 11 is a flow diagram of an embodiment of the process used in connection with the present invention.

Referring to FIG. 11, the process for updating a contact record 40 is discussed. At step 1102, a command is entered that indicates that a user is creating or editing a contact record 40. At step 1104, the computer 10 receives data from a user. The process then proceeds to step 1110. At step 1110, the computer 10 determines whether the entered data is in a field, such as the name field 42 or company field 44, which field is associated with a predefined filing format field. If the entered data is not in one of the fields associated with the predefined filing format fields, then the process proceeds to step 1104 where data may be received for the contact record. If, however, the data received for the contact record 40 is for a field that is used in a predefined filing format field, then the predefined filing formats are updated along with the "file as" field if the updated predefined filing format field was used as the filing identifier. At step 1116, the non-blank predefined filing format fields associated with the drop down menu 72 are populated. At step 1120, if the user has saved the contact record 40 without selecting a predefined filing format, the process proceeds to step 1124 where the default predefined filing format is saved. The process for updating the contact record 40 is ended at step 1140. If, however, at step 1120, the user has not saved the contact record 40, the process proceeds to step 1130. If, at step 1130, the user has not selected a predefined filing format field then the process proceeds to step 1104. If, at step 1130, the user selected a predefined filing format for the "file as" field or if the user entered another filing identifier in the "file as" field, the user selected filing identifier is saved. The process for updating the contact record 40 is ended at 1140.

Thus, as noted above, a system and method is provided that receives information in at least one of a plurality of data fields associated with the data record and provides a designated field for receiving a filing identifier. The filing identifier identifies the location used by the computer system for storing the data record. The filing identifier in the designated field may be automatically updated in response to receiving the information within data fields of the data record.

In addition, the system and method may automatically generate a plurality of predefined filing formats for the filing identifier based on the information received in at least one of the data fields of the data record. Each predefined filing format is contained in a filing format field. The computer may select one of the predefined filing formats for the filing identifier by automatically inserting one of the predefined filing formats into the designated field. Also, the system may include automatically updating the information in the predefined filing format fields if the information received in at least one of the data fields is modified. The foregoing relates to the preferred embodiment of the present invention, and many changes may be made therein without departing from the scope of the invention as defined by the following claims.

We claim:

1. A computer-implemented method for filing information in a computer system, the information associated with a one of a plurality of data records, said data records having a plurality of fields for receiving information related to the subject of said data record, comprising the steps of:

providing a plurality of information fields associated with said data record;

providing a designated field in said data record for a filing identifier for said data record;

in response to entry of information by a user into one of the plurality of information fields of said data record, automatically generating a filing identifier in the designated field, the filing identifier comprising information automatically selected from one of the plurality of information fields of the data record;

storing the information of said data record including the designated field in a memory of the computer system;

in response to a user command for data output of said data record, outputting said data record from the computer system memory in accordance with the filing identifier in the designated field.

2. The method of claim 1 further comprising the step of providing a pointer to the filing identifier, said pointer operative to support displaying said filing identifier of said data record.

3. The method of claim 1 further comprising the step of automatically generating, by said computer system, a plurality of predefined filing formats for said filing identifier based on said information received in at least one of said information fields.

4. The method of claim 3 further comprising the step of selecting a default filing identifier from one of said predefined filing formats.

5. The method of claim 3 further comprising the step of providing an option to select one of said predefined filing formats for automatic insertion in said designated field.

6. The method of claim 3 further comprising automatically updating said predefined filing formats if said information received in at least one of said information fields is modified.

7. The method of claim 6 further comprising the step of providing a plurality of options for selecting one of said predefined filing formats for automatic insertion in said designated field.

8. The method of claim 7 further comprising the step of accepting a selected one of said options for insertion in said designated field.

9. The method of claim 7 further comprising the step of automatically updating said filing identifier if information in one of said information fields associated with said selected option is modified.

10. The method of claim 1 further comprising the step of automatically updating said filing identifier when information in one of said information fields is modified by the user.

11. A computer-implemented method for filing information in a computer system associated with a one of a plurality of data records, said data records having a plurality of fields for receiving information related to the subject of said data record, comprising the steps of:

providing a plurality of information fields associated with the data record;

providing a designated field in said data record for storing a filing identifier indicative of a selected manner in which the data record is to be filed, the filing identifier comprising information automatically selected from one of the plurality of information fields of the data record;

in response to entry of information by a user into one of the plurality of information fields of said data record, automatically generating a plurality of selectable filing identifiers in a plurality of different predefined filing formats based on said information received in at least one of said information fields; and displaying the selectable filing identifiers to the user to allow user selection of one of the filing identifiers.

12. The method of claim 11 further comprising the step of providing a pointer to the filing identifier, said pointer operative to support displaying said predefined filing formats of said data record.

13. The method of claim 11 further comprising the step of automatically updating, by said computer system, said filing identifier when information in at least one of said plurality of information fields associated with the data record is modified.

14. The method of claim 13 further comprising a automatically updating said filing identifier if information from one of said information fields associated with one of said predefined filing formats is modified.

15. The method of claim 13 further comprising the step of selecting a default identifier from one of said predefined filing formats.

16. The method of claim 11 further comprising the step of providing an option to select one of said predefined filing formats for automatic insertion in said designated field.

17. The method of claim 16 further comprising automatically updating said predefined filing formats if said information received in at least one of said information fields is modified.

18. The method of claim 17 further comprising the step of providing a plurality of options for selecting one of said predefined filing formats for automatic insertion in said designated field.

19. The method of claim 18 further comprising the step of accepting a selected one of said options for insertion in said designated field.

20. A computer system operative to display computer application data in a data record on a display monitor, said data records having a plurality of fields for receiving information related to the subject of said data record, comprising:

a central processing unit (CPU); a memory; a display monitor, and a system bus, said memory and said display monitor communicating with said CPU; and said CPU having an operating system interacting with a computer program, said computer program operative for displaying a plurality of information fields for data entry by a user, said information fields including a designated field for storing a filing identifier for said data record, the filing identifier comprising information automatically selected from one of the plurality of information fields of the data record;

said computer program being further operative to receive information entered by the user in at least one of said information fields associated with said data record and operative to automatically update said filing identifier located in said designated field of said data record when information in said at least one of said selected fields is modified;

said computer program being further operative for filing said data record in accordance with information stored in said designated field.

* * * * *